United States Patent
Chang et al.

(10) Patent No.: US 9,435,374 B1
(45) Date of Patent: Sep. 6, 2016

(54) ROLLER BEARING DEVICE HAVING RESILIENT SPACER

(71) Applicant: Hiwin Technologies Corp., Taichung (TW)

(72) Inventors: Che Kang Chang, Taichung (TW); Zong Sian Jiang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 14/694,023

(22) Filed: Apr. 23, 2015

(51) Int. Cl.
| F16C 19/40 | (2006.01) |
| F16C 27/04 | (2006.01) |
| F16C 19/06 | (2006.01) |
| F16C 33/38 | (2006.01) |
| F16C 33/66 | (2006.01) |

(52) U.S. Cl.
CPC .............. F16C 27/04 (2013.01); F16C 19/06 (2013.01); F16C 33/3818 (2013.01); F16C 33/6681 (2013.01)

(58) Field of Classification Search
USPC .................................................. 384/47, 551
See application file for complete search history.

(56) References Cited

U.S. PATENT DOCUMENTS

| 2,689,771 A | 4/1950 | Annen | |
| 3,350,148 A | 10/1967 | Sauguinetti et al. | |
| 3,770,992 A | 11/1973 | Veglia | |
| 4,687,345 A * | 8/1987 | Geka | F16C 29/065 384/44 |
| 4,896,974 A * | 1/1990 | Shimizu | F16C 19/362 384/44 |
| 4,993,850 A | 2/1991 | Howse | |
| 5,230,569 A | 7/1993 | Sheedy | |
| 7,438,474 B2 * | 10/2008 | Chen | F16C 29/041 384/47 |

FOREIGN PATENT DOCUMENTS

| DE | 102013207301 A1 * | 10/2014 | .......... F16C 33/3706 |
| JP | 4390324 B2 * | 12/2009 | .............. F16C 33/37 |

* cited by examiner

*Primary Examiner* — Phillip A Johnson
(74) *Attorney, Agent, or Firm* — Charles E. Baxley

(57) ABSTRACT

A roller bearing device includes an outer housing and an inner housing, and an endless raceway formed between the housings for engaging with a bearing device, the bearing device includes a number of roller bearing members and a number of spacers engaged between the roller bearing members, the spacers each include a curved recess formed in each side portion for engaging with the roller bearing members, the curved recesses of each spacer is perpendicular to each other, and the spacers each include a channel for forming two resilient blades and for resiliently engaging with the roller bearing members and for stably anchoring the spacers between the roller bearing members.

15 Claims, 5 Drawing Sheets

ROLLER BEARING DEVICE HAVING RESILIENT SPACER

BACKGROUND OF THE INVENTION

1. Field of the Invention

The present invention relates to a roller bearing device, and more particularly to a roller bearing device including a spacer having a resilient and improved structure or configuration for resiliently contacting or engaging with the ball or roller bearing members and for allowing the spacer to be suitably and solidly and stably engaged and anchored or retained between the ball or roller bearing members.

2. Description of the Prior Art

Various kinds of typical roller bearing devices or facilities have been developed and used in industries and comprise two movable members rotatable or movable relative to each other, and a number of ball or roller bearing elements disposed between the two movable members for facilitating the sliding movement between the two movable members.

For example, U.S. Pat. No. 2,689,771 to Annen, U.S. Pat. No. 3,350,148 to Sauguinetti et al., U.S. Pat. No. 3,770,992 to Veglia, U.S. Pat. No. 4,993,850 to Howse, and U.S. Pat. No. 5,230,569 to Sheedy disclose several of the typical roller bearing devices or facilities each comprising two movable members or bearing rings rotatable or movable relative to each other, and a number of loaded ball bearing elements disposed between the two movable members for facilitating the sliding movement between the two movable members.

However, the typical roller bearing devices or facilities did not teach or disclose a number of spacers that may be stably engaged between the ball or roller bearing members for suitably anchoring or retaining or positioning the spacers and the ball or roller bearing members in place.

The other typical motion guide apparatuses, such as the linear motion guide apparatuses or the ball screw devices comprise a number of ball or roller bearing elements disposed between two movable members that are rotatable or movable relative to each other, for facilitating the sliding movement between the two movable members, and may comprise a number of spacers disposed or engaged between the ball or roller bearing members for suitably anchoring or retaining or positioning the spacers between the ball or roller bearing members.

However, the spacers normally includes a solid structure or configuration that may not be resiliently contacted or engaged with the ball or roller bearing members and that may not apply a resilient force onto the ball or roller bearing members such that the spacer may not be suitably and solidly and stably engaged and anchored or retained between the ball or roller bearing members.

The present invention has arisen to mitigate and/or obviate the afore-described disadvantages of the conventional roller bearing devices.

SUMMARY OF THE INVENTION

The primary objective of the present invention is to provide a roller bearing device including a spacer having an improved and resilient structure or configuration for resiliently contacting or engaging with the roller bearing members and for allowing the spacer to be suitably and solidly and stably engaged and anchored or retained between the roller bearing members.

In accordance with one aspect of the invention, there is provided a roller bearing device comprising an outer housing including a chamber formed therein, and including an inner peripheral rail formed therein and communicating with the chamber of the outer housing, an inner housing engaged in the chamber of the outer housing and including an outer peripheral track formed therein and directed toward the rail of the outer housing for forming an endless raceway between the outer and the inner housings, and a bearing device engaged in the endless raceway which is formed between the outer and the inner housings, the bearing device including a number of roller bearing members, and a number of spacers engaged between the roller bearing members, the spacers each including a first side portion having a first curved recess formed therein for engaging with a first of the roller bearing members, and the spacers each including a second side portion having a second curved recess formed therein and perpendicular to the first curved recess at the first side portion of the spacer for engaging with a second of the roller bearing members, and the spacers each including a channel formed therein for forming two resilient blades and for resiliently engaging with the first and the second roller bearing members and for stably anchoring the spacers between the roller bearing members. Every two adjacent bearing members are disposed in a stagger way, or the longitudinal axes of the two adjacent roller bearing members are offset from each other and perpendicular to each other.

The spacers each include a front surface, an upper surface, a rear surface, and a bottom surface, and the channel is formed in the upper surface, and the channel is preferably formed between the front surface and the rear surface for forming the resilient blades on the upper portion of the spacer. The upper surface includes a thickness (T) greater than a thickness (t) of the bottom surface of the spacer.

The spacers each include a notch formed in the front surface, and/or in the rear surface, and/or in the upper surface, and/or in the bottom surface of the spacer, and the spacers each include an opening formed through a center portion thereof for receiving or engaging with the lubricating grease or oil.

The spacers each include two curved planes for defining each of the first and the second curved recesses. The curved planes of the spacers include a radius (R) greater than a radius (r) of the roller bearing members for allowing the roller bearing members to be in line contact with the curved planes of the spacer, but not in surface contact with the curved planes of the spacer.

The first roller bearing member is contacted with the curved plane of one of the resilient blades of the spacer at a contact point (P), and the contact point (P) of the first roller bearing member with the curved plane of the one resilient blade is spaced from the upper surface of the spacer for a distance (H), and the channel of the spacer includes a depth (D) greater than the distance (H) of the contact point (P) of the first roller bearing member with the curved plane of the one resilient blade of the spacer for increasing the resilience of the resilient blade.

The first and the second curved recesses of the spacers each include a curvature greater than that of the roller bearing members. The spacers each include a groove formed in the bottom surface, and the grooves of the spacers each include a width (a) smaller than a width (W) of the channel of the spacer, and each include a depth (d) smaller than a depth (D) of the channel of the spacer for receiving or engaging with the lubricating grease or oil.

Further objectives and advantages of the present invention will become apparent from a careful reading of the detailed

DETAILED DESCRIPTION OF THE PREFERRED EMBODIMENT

Figure 1:
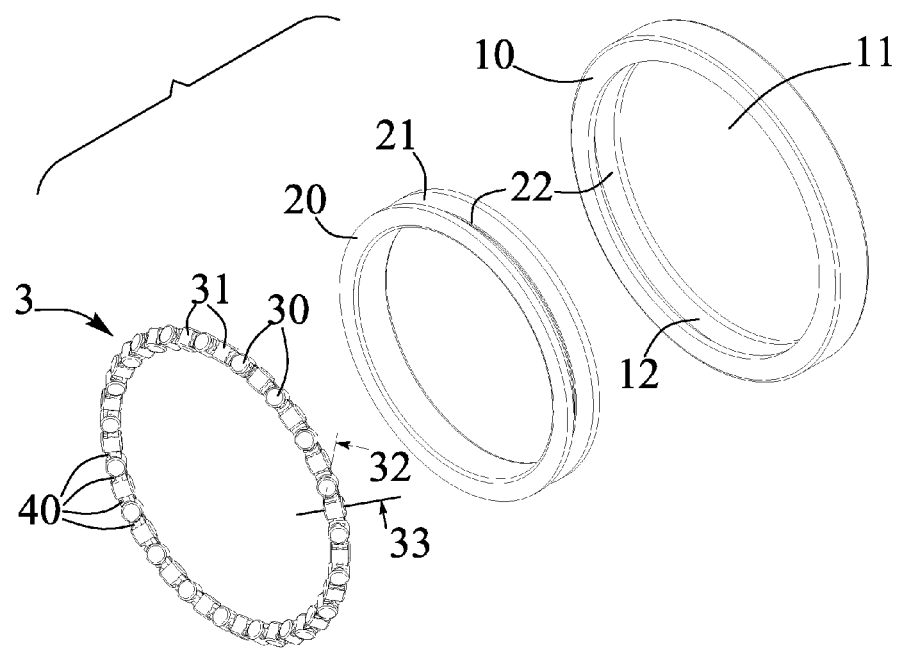
FIG. 1 is an exploded view of a roller bearing device in accordance with the present invention.
Figure 2:
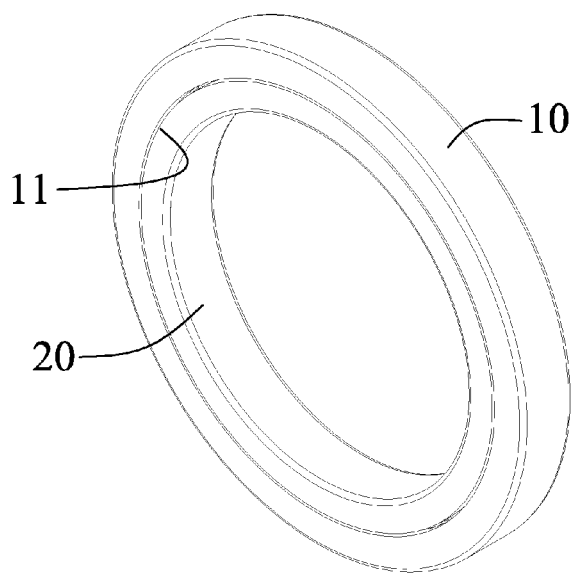
FIG. 2 is a perspective view of the roller bearing device.

Referring to the drawings, and initially to FIGS. 1-2, a roller bearing device in accordance with the present invention comprises an outer bearing ring or housing 10 including an opening or compartment or chamber 11 formed therein, and including an inner peripheral recess or groove or rail 12 formed or provided therein and communicating with the chamber 11 of the outer housing 10, and an inner bearing ring or housing 20 disposed or engaged within the chamber 11 of the outer housing 10 and including an outer peripheral depression or slot or track 21 formed therein and faced or directed toward the rail 12 of the outer housing 10 for forming or defining an endless conduit or passage or pathway or raceway 22 between the outer and the inner housings 10, 20 and for slidably receiving or engaging with a number of roller bearing members 30, 31 of a bearing device 3.

The bearing device 3 further includes a number of spacers 40 disposed or engaged between the roller bearing members 30, 31 for resiliently contacting or engaging with the roller bearing members 30, 31 and for suitably and solidly and stably anchoring or retaining or positioning the spacers 40 between the roller bearing members 30, 31, in which the two adjacent bearing members 30, 31 are disposed or arranged in a stagger way, or the longitudinal axes 32, 33 of the roller bearing members 30, 31 are offset from each other and substantially perpendicular to each other, best shown in FIG. 1. As shown in FIGS. 3-10, the spacers 40 each include two curved depressions or recesses 41, 42 formed in the two opposite side portions 43, 44, such as the first side portion 43 and the second side portion 44 for engaging with the roller bearing members 30, 31 respectively.

Figure 3:
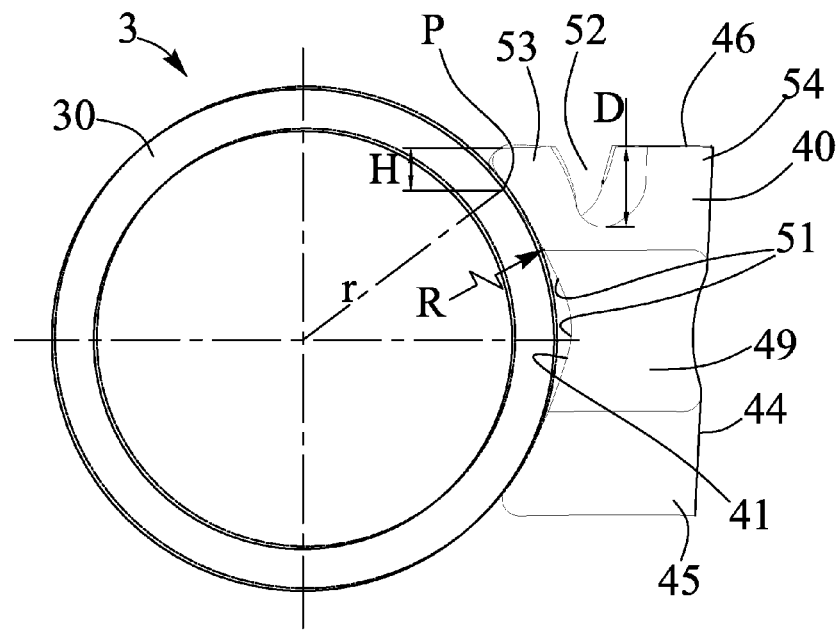
FIG. 3 is a partial front plan schematic view illustrating one roller bearing member and one spacer of the roller bearing device.
Figure 4:
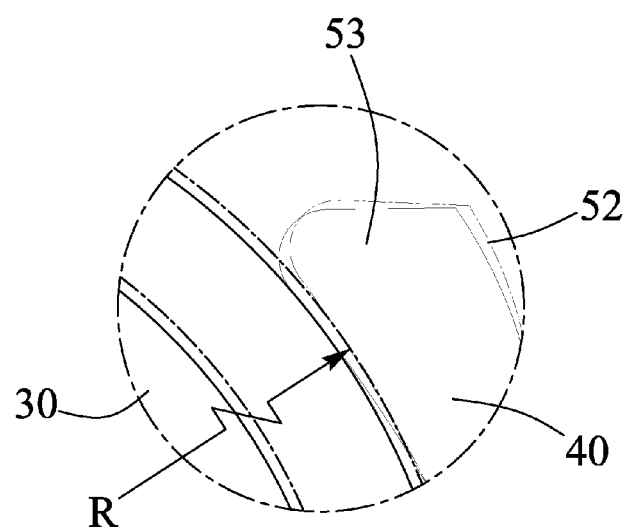
FIG. 4 is an enlarged partial front plan schematic view of the roller bearing device.
Figure 5:
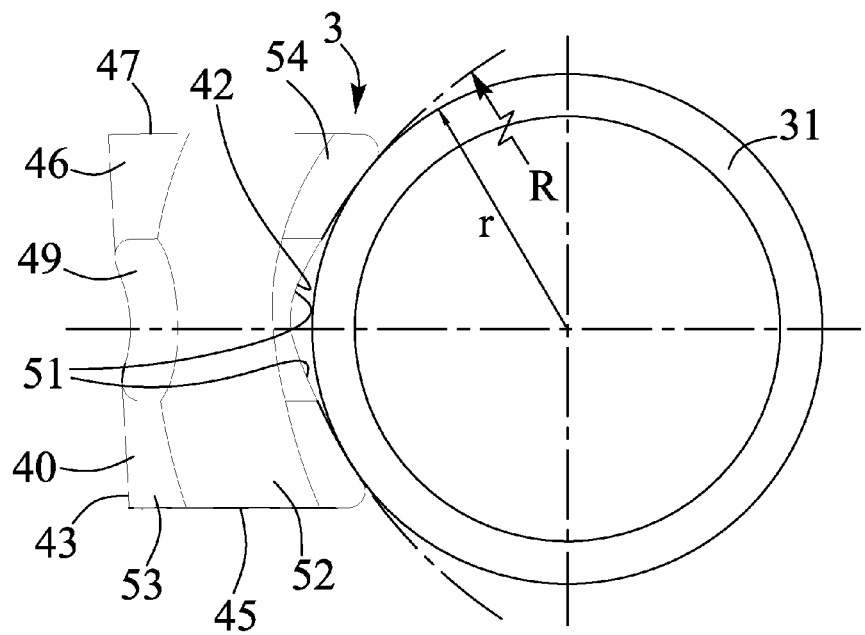
FIG. 5 is a partial top plan schematic view illustrating one roller bearing member and one spacer of the roller bearing device.
Figure 6:
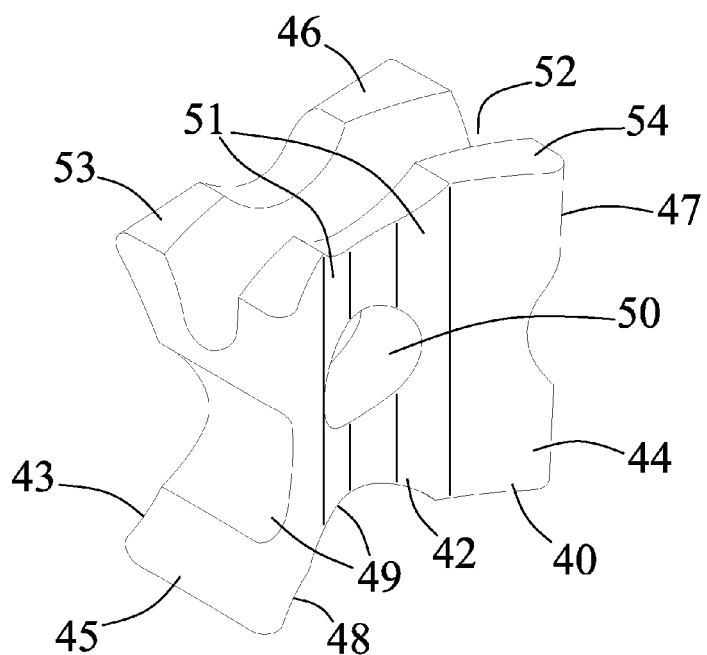
FIG. 6 is a front and upper perspective view of the roller bearing device.
Figure 7:
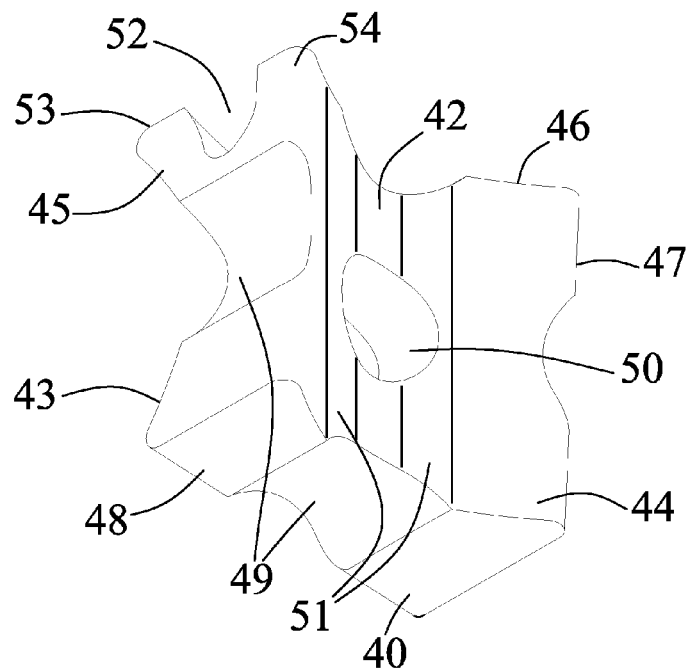
FIG. 7 is a front and bottom perspective view of the roller bearing device.
Figure 8:
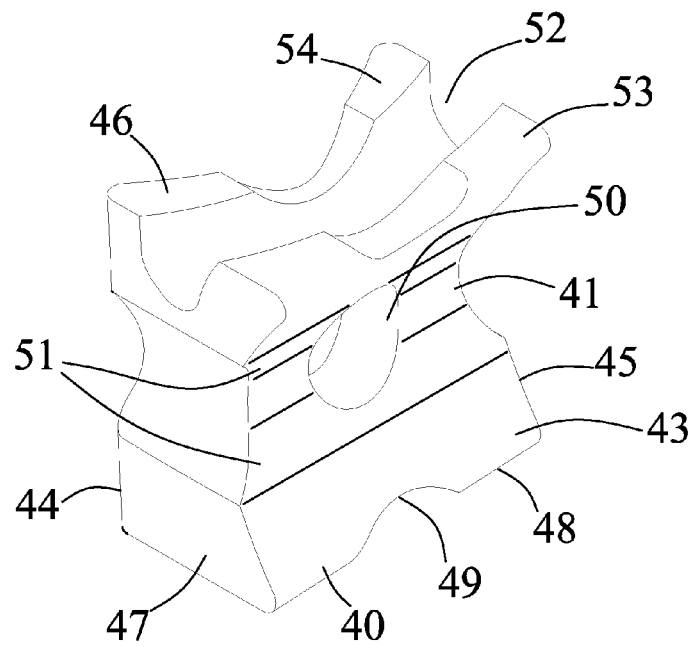
FIG. 8 is a rear and upper perspective view of the roller bearing device.
Figure 9:
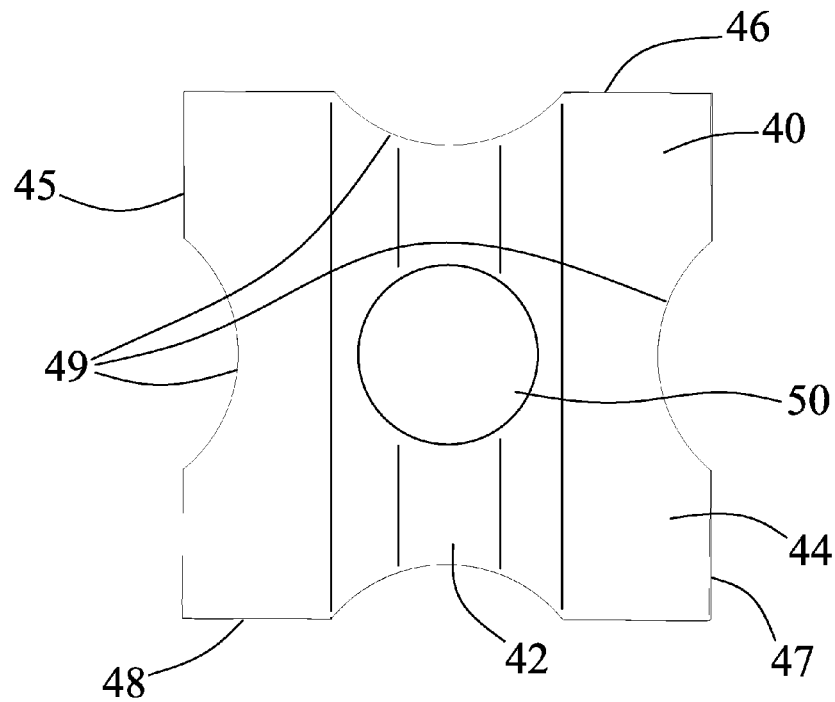
FIG. 9 is a side plan schematic view illustrating one spacer of the roller bearing device.

The two curved recesses 41, 42 formed in the opposite side portions 43, 44 of the spacer 40 are substantially perpendicular to each other for suitably engaging with the roller bearing members 30, 31 respectively, best shown in FIGS. 3-5, and for allowing the longitudinal axes 32, 33 of the roller bearing members 30, 31 to be substantially perpendicular to each other. The spacers 40 each further include a first or front portion or surface 45, a second or upper portion or surface 46, a third or rear portion or surface 47, and a fourth or bottom portion or surface 48, in which the first or front surface 45 and the third or rear surface 47 are spaced from each other and substantially parallel to each other, and the second or upper surface 46 and the fourth or bottom surface 48 are also spaced from each other and substantially parallel to each other, best shown in FIG. 9.

Figures 10, 11:
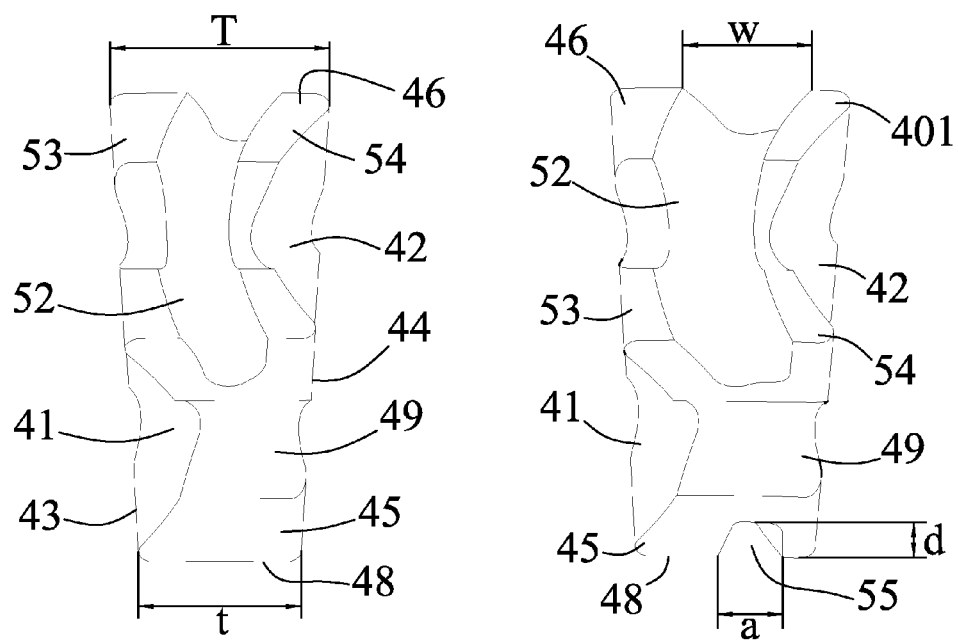
FIG. 10 is a front and upper plan schematic view of the spacer.
FIG. 11 is another front and upper plan schematic view of the spacer similar to FIG. 10, illustrating the other arrangement of the spacer of the roller bearing device.

The spacers 40 each further include a depression or recess or notch 49 formed in each of the surfaces 45-48 and communicating with the curved recesses 41, 42 of the spacer 40 for receiving or engaging with the lubricating grease or oil (not illustrated) and for allowing the lubricating grease or oil to flow between the surfaces 45-48 and the side portions 43, 44 of the spacer 40. The spacers 40 each further include a hole or orifice or opening 50 formed through the center portion thereof and communicating with the curved recesses 41, 42 of the spacer 40 for allowing the lubricating grease or oil to flow between the side portions 43, 44 and the curved recesses 41, 42 of the spacer 40. As shown in FIG. 10, it is preferable, but not necessary that the upper portion or surface 46 includes a thickness (T) greater than that (t) of the bottom surface 48 of the spacer 40.

As shown in FIGS. 3 and 5, the spacer 40 each include two curved surfaces or planes 51 arranged in a mirror symmetric status, for forming or defining each curved recess 41, 42 thereof, and the curved planes 51 include a radius (R) greater than that (r) of the roller bearing members 30, 31 for allowing the roller bearing members 30, 31 to be in line contact, but not in surface contact with the curved planes 51 of the spacer 40; or the curved recesses 41, 42 or the curved planes 51 of the spacer 40 include a greater curvature than that of the roller bearing members 30, 31 for allowing the roller bearing members 30, 31 to be in line contact, but not in surface contact with the curved planes 51 of the spacer 40. The spacers 40 each further include a depression or recess or channel 52 formed in the upper surface 46 and formed and located between and/or communicating with the front surface 45 and the rear surface 47 (FIG. 5) for forming or defining two resilient blades 53, 54 and for resiliently contacting or engaging with the roller bearing members 30, 31 (FIGS. 3-5).

As shown in FIG. 3, the contact point (P) of the roller bearing member 30 with the curved plane 51 of the resilient blade 53 is spaced from the upper portion or surface 46 for a distance (H), and the channel 52 of the spacer 40 includes a depth (D) greater than the distance (H) of the contact point (P) of the roller bearing member 30 with the curved plane 51 of the resilient blade 53 for about 40-65%, for allowing the resilient blades 53, 54 to be resiliently contacted or engaged with the roller bearing members 30, 31. As shown in FIG. 11, the spacer 401 may further include a depression or recess or groove 55 formed in the bottom surface 48, and the groove 55 of the spacer 401 includes a depth (d) smaller than the depth (D, FIG. 3) of the channel 52 of the spacer 401, and includes a width (a) smaller than the width (W) of the channel 52 of the spacer 401, for receiving or engaging with the lubricating grease or oil (not illustrated).

Accordingly, the roller bearing device in accordance with the present invention includes a spacer having a resilient and improved structure or configuration for resiliently contacting or engaging with the roller bearing members and for allowing the spacer to be suitably and solidly and stably engaged and anchored or retained between the roller bearing members.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A roller bearing device comprising:
an outer housing including a chamber formed therein, and including an inner peripheral rail formed therein and communicating with said chamber of said outer housing,
an inner housing engaged in said chamber of said outer housing and including an outer peripheral track formed therein and directed toward said rail of said outer housing for forming an endless raceway between said outer and said inner housings, and
a bearing device engaged in said endless raceway which is formed between said outer and said inner housings, said bearing device including a plurality of roller bearing members, and a plurality of spacers engaged between said roller bearing members, said spacers each including a first side portion having a first curved recess formed therein for engaging with a first of said roller bearing members, said spacers each including a second side portion having a second curved recess formed therein for engaging with a second of said roller bearing members, and said first and said second curved recesses of each spacer being perpendicular to each other, and said spacers each including a channel formed therein for forming two resilient blades and for resiliently engaging with said first and said second roller bearing members.

2. The roller bearing device as claimed in claim 1, wherein said spacers each include a front surface, an upper surface, a rear surface, and a bottom surface, and said channel is formed in said upper surface.

3. The roller bearing device as claimed in claim 2, wherein said channel is formed between said front surface and said rear surface.

4. The roller bearing device as claimed in claim 2, wherein said spacers each include a notch formed in said front surface.

5. The roller bearing device as claimed in claim 2, wherein said spacers each include a notch formed in said rear surface.

6. The roller bearing device as claimed in claim 2, wherein said spacers each include a notch formed in said upper surface.

7. The roller bearing device as claimed in claim 2, wherein said spacers each include a notch formed in said bottom surface.

8. The roller bearing device as claimed in claim 2, wherein said upper surface includes a thickness (T) greater than a thickness (t) of said bottom surface of said spacer.

9. The roller bearing device as claimed in claim 2, wherein said spacers each include a groove formed in said bottom surface.

10. The roller bearing device as claimed in claim 9, wherein said grooves of said spacers each include a width (a) smaller than a width (W) of said channel of said spacer, and each include a depth (d) smaller than a depth (D) of said channel of said spacer.

11. The roller bearing device as claimed in claim 1, wherein said spacers each include an opening formed through a center portion thereof.

12. The roller bearing device as claimed in claim 1, wherein said spacers each include two curved planes for defining each of said first and said second curved recesses.

13. The roller bearing device as claimed in claim 12, wherein said curved planes of said spacers include a radius (R) greater than a radius (r) of said roller bearing members.

14. The roller bearing device as claimed in claim 12, wherein said first roller bearing member is contacted with said curved plane of one of said resilient blades of said spacer at a contact point (P), and said contact point (P) of said first roller bearing member with said curved plane of said one resilient blade is spaced from said upper surface of said spacer for a distance (H), and said channel of said spacer includes a depth (D) greater than said distance (H) of said contact point (P) of said first roller bearing member with said curved plane of said one resilient blade of said spacer.

15. The roller bearing device as claimed in claim 1, wherein said first and said second curved recesses of said spacers each include a curvature greater than that of said roller bearing members.

* * * * *